UNITED STATES PATENT OFFICE.

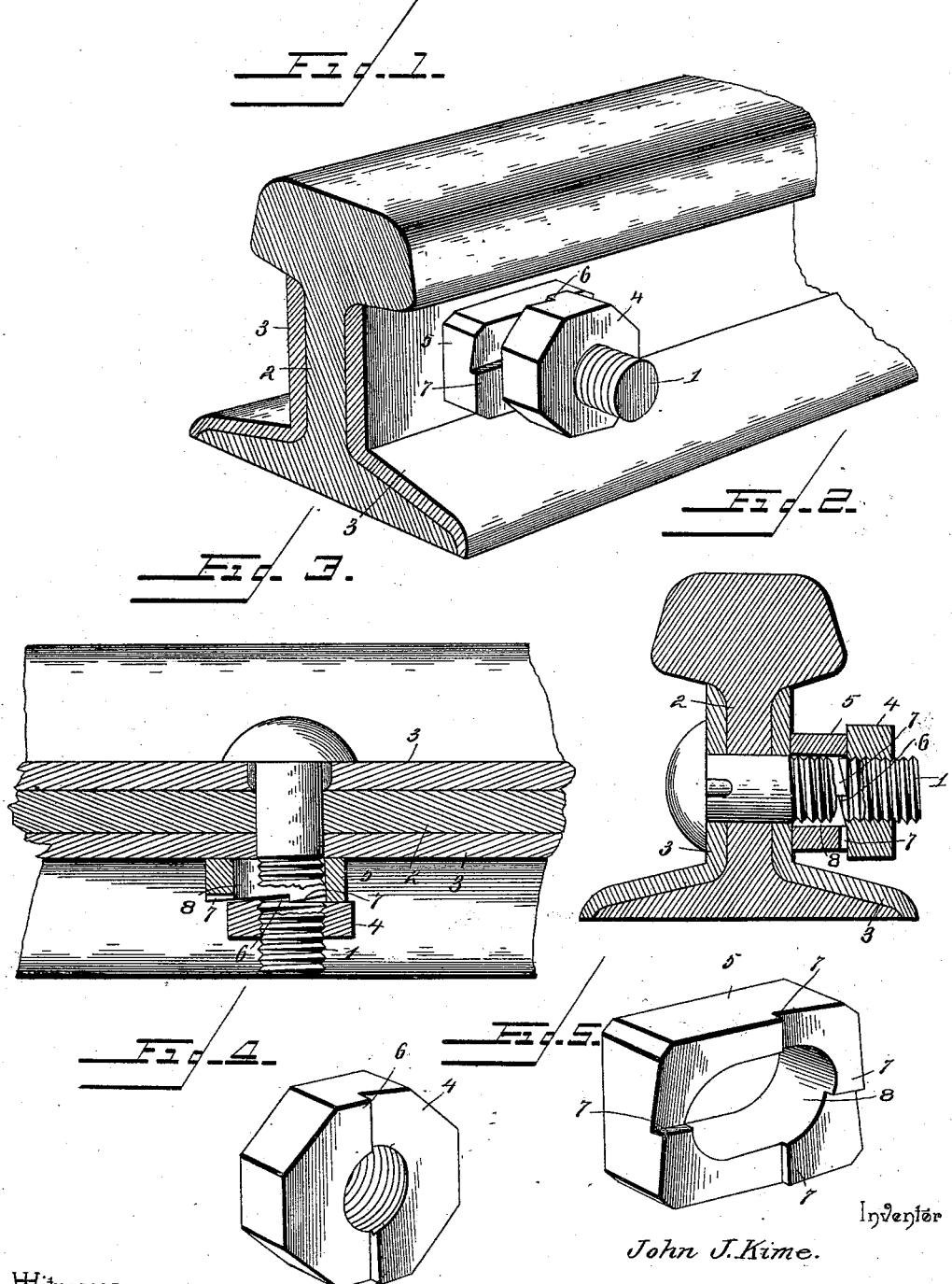

JOHN J. KIME, OF KENDALLVILLE, INDIANA, ASSIGNOR OF ONE-HALF TO JOHN D. KELLY, OF SAME PLACE.

NUT-LOCK.

SPECIFICATION forming part of Letters Patent No. 540,021, dated May 28, 1895.

Application filed March 23, 1895. Serial No. 542,949. (No model.)

*To all whom it may concern:*

Be it known that I, JOHN J. KIME, a citizen of the United States, residing at Kendallville, in the county of Noble and State of Indiana, have invented a new and useful Nut-Lock, of which the following is a specification.

The invention relates to improvements in nut locks.

The object of the present invention is to improve the construction of nut locks, and to provide a simple and efficient one, capable of securely holding a nut against accidental retrograde rotation, and adapted to be readily adjusted to permit a nut to be unscrewed without injuring the nut lock.

The invention consists in the construction and novel combination and arrangement of parts hereinafter fully described, illustrated in the accompanying drawings, and pointed out in the claim hereto appended.

In the drawings, Figure 1 is a perspective view of a portion of a rail-joint having a bolt and nut provided with a nut-lock constructed in accordance with this invention. Fig. 2 is a transverse sectional view of the same, the parts being arranged to permit the locking-plate or washer to be moved longitudinally. Fig. 3 is a horizontal sectional view, the nut being arranged to prevent the locking-plate or washer from being shifted longitudinally. Fig. 4 is a detail perspective view of the nut. Fig. 5 is a similar view of the locking-plate or washer.

Like numerals of reference indicate corresponding parts in all the figures of the drawings.

1 designates a bolt disposed horizontally, and passing through a rail 2 and fish-plates 3, and having arranged on its threaded end a nut 4, and interposed between the inner face of the nut and the adjacent fish-plate is a locking plate or washer 5. The nut is provided on its inner face with a pair of diametrically disposed ratchet teeth 6, having engaging shoulders, adapted to interlock with corresponding ratchet teeth 7 of the locking plate or washer 5.

The locking plate or washer 5 is oblong, and is provided with a slot or elongated bolt opening 8, and it has its teeth 7 arranged on its outer face. The teeth 7 are located at the sides and ends of the bolt opening or slot 8, and are preferably four in number, and the locking plate or washer is located sufficiently close to the bottom flange or portion of the fish-plate, to prevent the nut from rotation. The locking plate or washer is normally located centrally of the bolt, and when the teeth of the nut are arranged vertically, the locking plate or washer is prevented from moving longitudinally on the bolt; but when it is desired to release the nut, or to permit the same to be unscrewed, it is rotated forward a quarter-turn, to bring its teeth in a horizontal position, as illustrated in Fig. 2 of the accompanying drawings, and when the nut is in this position, the locking plate or washer is adapted to be moved longitudinally to the right, to bring it to a position in which the left hand end will clear the bottom of the fish-plate, and permit the nut to be unscrewed. After a half revolution of the nut and the washer, if there is not sufficient space to disengage the ratchet teeth, the locking plate or washer may be again moved longitudinally, so as to clear the bottom portion of the fish-plate. In this manner the nut may be readily removed without injuring any of the parts of the nut lock.

Although the nut lock is shown applied to a rail-joint, yet it may be readily employed in various other places, as will be clearly apparent.

When the nut-lock is employed on rail joints and the like, the inner face of the locking plate or washer is preferably smooth, but when the device is to be used on wooden surfaces the locking washer or plate may be provided on its inner face with spurs or projections for engaging such wooden surface, to hold the locking washer or plate against rotation.

It will be seen that the nut lock is exceedingly simple and inexpensive in construction, that it possesses great strength and durability, and that it is capable of effectually holding a nut against accidental unscrewing, and that it will permit a nut to be readily removed when desired.

Changes in the form, proportion, and the minor details of construction may be resorted to without departing from the principle or sacrificing any of the advantages of this invention.

What I claim is—

In a nut lock, the combination with a bolt, of a nut provided on its inner face with ratchet teeth, and an oblong locking plate or washer having a slot or elongated bolt opening and provided on its outer face at the sides and ends of the slot or opening with ratchet teeth adapted to interlock with those of the nut, the latter being capable of securing the locking plate or washer against movement, and being adapted to be rotated forward a partial revolution, to release the locking plate or washer, substantially as and for the purpose described.

In testimony that I claim the foregoing as my own I have hereto affixed my signature in the presence of two witnesses.

JOHN J. KIME.

Witnesses:
 THOMAS L. GRAVES,
 S. T. EMRICK.